J. R. Henshaw,

Snap Hook,

No. 2,166, Reissued Feb. 6, 1866.

N. PETERS, PHOTO-LITHOGRAPHER, WASHINGTON, D. C.

UNITED STATES PATENT OFFICE.

THE MIDDLETOWN TOOL COMPANY, OF MIDDLETOWN, CONNECTICUT, ASSIGNEES, BY MESNE ASSIGNMENTS, OF J. R. HENSHAW.

SELF-MOUSING HOOK.

Specification forming part of Letters Patent No. 21,879, dated October 26, 1858; Reissue No. 2,166, dated February 6, 1866.

*To all whom it may concern:*

Be it known that JOHN R. HENSHAW, of Middletown, in the county of Middlesex and State of Connecticut, has invented a new and useful Improvement in Self-Mousing or Snap Hooks; and we do hereby declare that the following is a full, clear, and exact description of the same, reference being had to the annexed drawings, making a part of this specification, in which—

Figure 1:
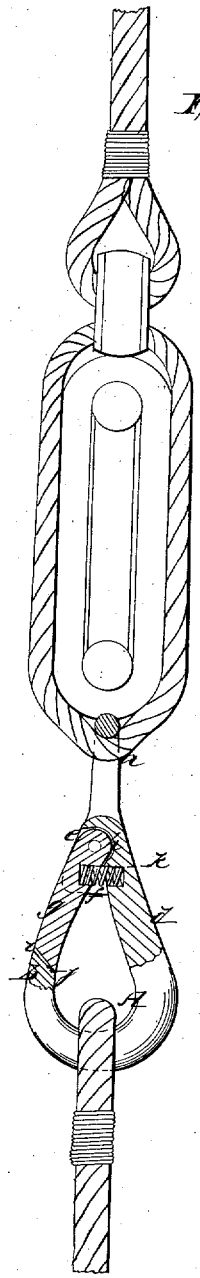
Figure 2:
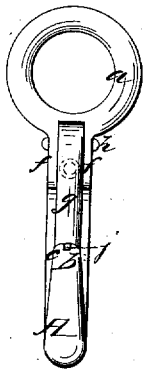

Figure 1 is a side view, partly in section, of a hook constructed in accordance with this invention. Fig. 2 is an end view of the same.

Similar letters of reference indicate corresponding parts in the two figures.

To enable those skilled in the art to fully understand and construct this invention, we will proceed to describe it.

A represents a hook constructed of metal, and having an eye or loop, *a*, formed at one end, as usual. The front or end *b* of the hook is made oblique, forming an angle of about forty-five degrees with the sides thereof, and a groove, *c*, may be made centrally in and across the face of the end *b*. At the end of the shank *d* of the hook adjoining the eye *a* a socket, *e*, is formed by having an ear, *f*, made at each side of the shank *d*, and within the socket *e* one end of a snap-bar, *g*, is pivoted, as shown at *h*. The opposite end of the bar *g* is beveled, as shown at *i*, and corresponding inversely with the end *b* of the hook A, as shown clearly in Fig. 1, and if the opposite face of the end *b* be provided with a groove, as before said, then the end *i* should have a ledge or projection, *j*, formed on it, which ledge should fit in the groove *e* of the end *b* of the hook. Within the socket *e* a spiral spring, *k*, is fitted. This spring is constructed of brass—at least that would be the most preferable material—one end of the spring bearing against the bar *g* in a recess formed therein, while the other end bears against the shank *d* in a recess formed in the hook A. The spring *k* has a tendency to keep the end *i* of the bar *g* against the end *b* of the hook A, and as said ends are beveled the bar cannot be forced outward beyond the end *b*. The ledge or projection *j*, fitting in the groove *c*' prevents any lateral play of bar *g*.

From the above description it will be seen that the hook may be readily passed through a thimble or any loop for the bar *g*, will readily spring inward, and where the hook has been passed through the thimble the bar *g* will be immediately thrown back by the spring *k*, so that the thimble or loop cannot be casually detached or removed from the hook. The bar *j* therefore is a substitute for the spun yarn that is frequently attached to the point and shank of the hook to prevent the hook being casually detached or removed from the article placed, said yarn thus attached being technically termed a "mousing." This attachment of the spun yarn to the hook occupies considerable time, and is rather inconvenient to remove the hook or detach it from articles with which it is connected. By this improvement this difficulty is obviated, as the bar *g* is self-acting.

It is essential that the bar *k* be fully inclosed within the socket *e*, in order that it may be protected from injury. Thimbles placed on the hook often have a great deal of play, and move forward and backward thereon in a violent manner, sufficiently so to render inoperative any exposed spring; but in this invention the lips *f f* will receive all concussions of this character and fully protect the spring *k*.

Snap-hooks were heretofore constructed with the spring so located that it is not exposed to injury within the hook proper, but this was effected by forming outside of the hooks a socket or chamber in which the spring was located and arranged to act or bear upon a lever of the snap-bar or tail piece extending upward beyond the pivot or hinge into the said chamber—a construction involving much labor and expense, and which renders the hook too heavy for the many uses it is applied in the arts. Springs located between the hinge and the hook proper were also used, but under an arrangement which rendered the springs liable to be injured.

Disclaiming, therefore, the employment or use of a snap or spring bar attached to a hook, irrespective of the arrangement of the spring hereinbefore described, what is claimed as the invention of the said HENSHAW is—

Locating the spring of a snap-hook, substantially as shown and described, so as to act upon points intermediate between the hinge and hook proper, in combination with forming recesses for holding the spring, as set forth.

In testimony whereof the said MIDDLETOWN TOOL COMPANY, by A. H. JACKSON, president, have signed their name to this specification before two subscribing witnesses.

MIDDLETOWN TOOL CO.,
By A. H. JACKSON,
*Prest.*

Witnesses:
WALDO P. VINAL,
CHAS. G. R. VINAL.